United States Patent
Penny

(10) Patent No.: US 8,177,098 B2
(45) Date of Patent: May 15, 2012

(54) MOLDED PREFORM AND CONTAINER HAVING INTEGRATED POUR SPOUT

(75) Inventor: Michael E. Penny, Saline, MI (US)

(73) Assignee: Amcor Limited, Hawthorn, Victoria (AU)

( * ) Notice: Subject to any disclaimer, the term of this patent is extended or adjusted under 35 U.S.C. 154(b) by 806 days.

(21) Appl. No.: 11/804,406

(22) Filed: May 17, 2007

(65) Prior Publication Data

US 2008/0283552 A1 Nov. 20, 2008

(51) Int. Cl.
*B67D 1/16* (2006.01)
(52) U.S. Cl. ........ 222/111; 222/109; 222/571; 264/532; 264/539
(58) Field of Classification Search .......... 222/109–111, 222/566–574, 462; 264/523, 531–532, 537, 264/539; 425/525, 577
See application file for complete search history.

(56) References Cited

U.S. PATENT DOCUMENTS

| | | | | |
|---|---|---|---|---|
| 2,601,039 A | * | 6/1952 | Livingstone | 222/109 |
| 2,601,040 A | * | 6/1952 | Livingstone | 222/109 |
| 2,743,844 A | * | 5/1956 | Livingstone | 222/111 |
| 2,763,402 A | * | 9/1956 | Livingstone | 222/109 |
| 2,763,403 A | * | 9/1956 | Livingstone | 222/111 |
| 4,550,862 A | | 11/1985 | Barker et al. | |
| 4,640,855 A | | 2/1987 | St. Clair | |
| 4,844,302 A | * | 7/1989 | Lay | 222/568 |
| 4,917,268 A | * | 4/1990 | Campbell et al. | 222/109 |
| 4,989,757 A | * | 2/1991 | Krall | 222/111 |
| 5,071,037 A | * | 12/1991 | Moore et al. | 222/109 |
| 5,114,659 A | | 5/1992 | Krall | |
| 5,207,356 A | * | 5/1993 | Krall | 222/109 |
| 5,435,467 A | * | 7/1995 | Ekkert et al. | 222/109 |
| 5,522,519 A | * | 6/1996 | Bergner et al. | 215/382 |
| 5,902,526 A | * | 5/1999 | Davis et al. | 264/40.1 |
| 5,988,460 A | * | 11/1999 | Brecheisen et al. | 222/572 |
| 6,344,166 B1 | * | 2/2002 | Aoki et al. | 264/521 |
| 6,436,497 B1 | * | 8/2002 | Takahashi et al. | 428/35.7 |
| 6,824,731 B1 | * | 11/2004 | Zoppas | 264/523 |

FOREIGN PATENT DOCUMENTS

| | | |
|---|---|---|
| EP | 0329883 | 8/1989 |
| KR | 1019970005065 | 4/1997 |

OTHER PUBLICATIONS

International Search Report and Written Opinion dated Aug. 28, 2008 from corresponding International Patent Application No. PCT/US2008/006123.

* cited by examiner

*Primary Examiner* — Kevin P Shaver
*Assistant Examiner* — Andrew Bainbridge
(74) *Attorney, Agent, or Firm* — Harness, Dickey & Pierce, P.L.C.

(57) ABSTRACT

A one-piece plastic container includes a body defining a longitudinal axis and having an upper portion, a sidewall portion and a base portion. The upper portion has a spout defining an opening into the container and a finish offset radially outwardly from the spout. A trough defines a passage into the body. The trough slopes toward the passage and defines a non-orthogonal angle relative to the longitudinal axis. According to other features, the sidewall portion is integrally formed with and extends from the upper portion to the base portion. The base portion closes off an end of the container. The finish defines at least one thread, for attaching a closure thereon.

26 Claims, 7 Drawing Sheets

US 8,177,098 B2

MOLDED PREFORM AND CONTAINER HAVING INTEGRATED POUR SPOUT

TECHNICAL FIELD

This disclosure generally relates to plastic containers for retaining a commodity, such as a solid or liquid commodity. More specifically, this disclosure relates to a one-piece blown container having a pour spout arranged at an angle relative to a longitudinal axis of the container.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Typically, an upper portion of the plastic container defines an opening. This upper portion is commonly referred to as a finish and includes some means for engaging a cap or closure to close off the opening. In the traditional injection-stretch blow molding process, the finish remains substantially in its injection molded state while the container body is formed below the finish. The finish may include at least one thread extending radially outwardly around an annular sidewall defining a thread profile. In one application, a closure member or cap may define a complementary thread, or threads, that are adapted to cooperatively mate with the threads of the finish.

In some applications, it is desirable to provide a spout at the opening of the container. In one example, a spout may be formed as a secondary component and subsequently connected to a container after the container has been blown. Such independently made pour spouts can improve pouring from heavy or awkward to hold container designs. In some examples, a drip back feature can be incorporated into the pour spout that allows the consumer to pour into and dispense from the corresponding cap yet still ensure all of the cap's remaining contents drip back inside the container during cap reapplication.

In many instances, the spout, once connected to the container, may define an angle relative to a longitudinal axis of the container to facilitate pouring. While a container having an angled spout improves functionality of the container such as during pouring, the two-piece design requires significant material and manufacturing costs. Thus, there is a need for a one-piece container design that has a pourable spout feature incorporated into the finish of the container.

SUMMARY

Accordingly, the present disclosure provides a one-piece plastic container having a body defining a longitudinal axis and having an upper portion, a sidewall portion, and a base portion. The upper portion has a spout defining an opening into the container and a finish offset radially outwardly from the spout. A trough defines a passage into the body. The trough slopes toward the passage and defines a non-orthogonal angle relative to the longitudinal axis.

According to other features, the sidewall portion is integrally formed with and extends from the upper portion to the base portion. The base portion closes off an end of the container. The finish defines a means, such as at least one thread, for attaching a closure thereon.

According to yet other features, the spout includes a terminal lip defining a plane that extends generally perpendicularly to the longitudinal axis. The terminal lip is offset entirely above the finish in a direction away from the base. The spout defines a longitudinal slot extending from the terminal lip to the passage. The terminal lip transitions to the longitudinal slot along arcuate surfaces. The trough defines a first angle relative to a transverse line drawn through the container from the longitudinal axis to the passage. The trough defines a second angle relative to the transverse line from the longitudinal axis to a diametrically opposed point relative to the passage. The first angle can be greater than the second angle. The first angle can be about five (5) degrees and the second angle can be about two (2) degrees.

Additional benefits and advantages of the present disclosure will become apparent to those skilled in the art to which the present disclosure relates from the subsequent description and the appended claims, taken in conjunction with the accompanying drawings. It will also be appreciated by those skilled in the art to which the present disclosure relates that the container of the present disclosure may be manufactured utilizing alternative blow molding processes to those disclosed above.

DETAILED DESCRIPTION

The following description is merely exemplary in nature, and is in no way intended to limit the disclosure or its application or uses.

Figure 1:
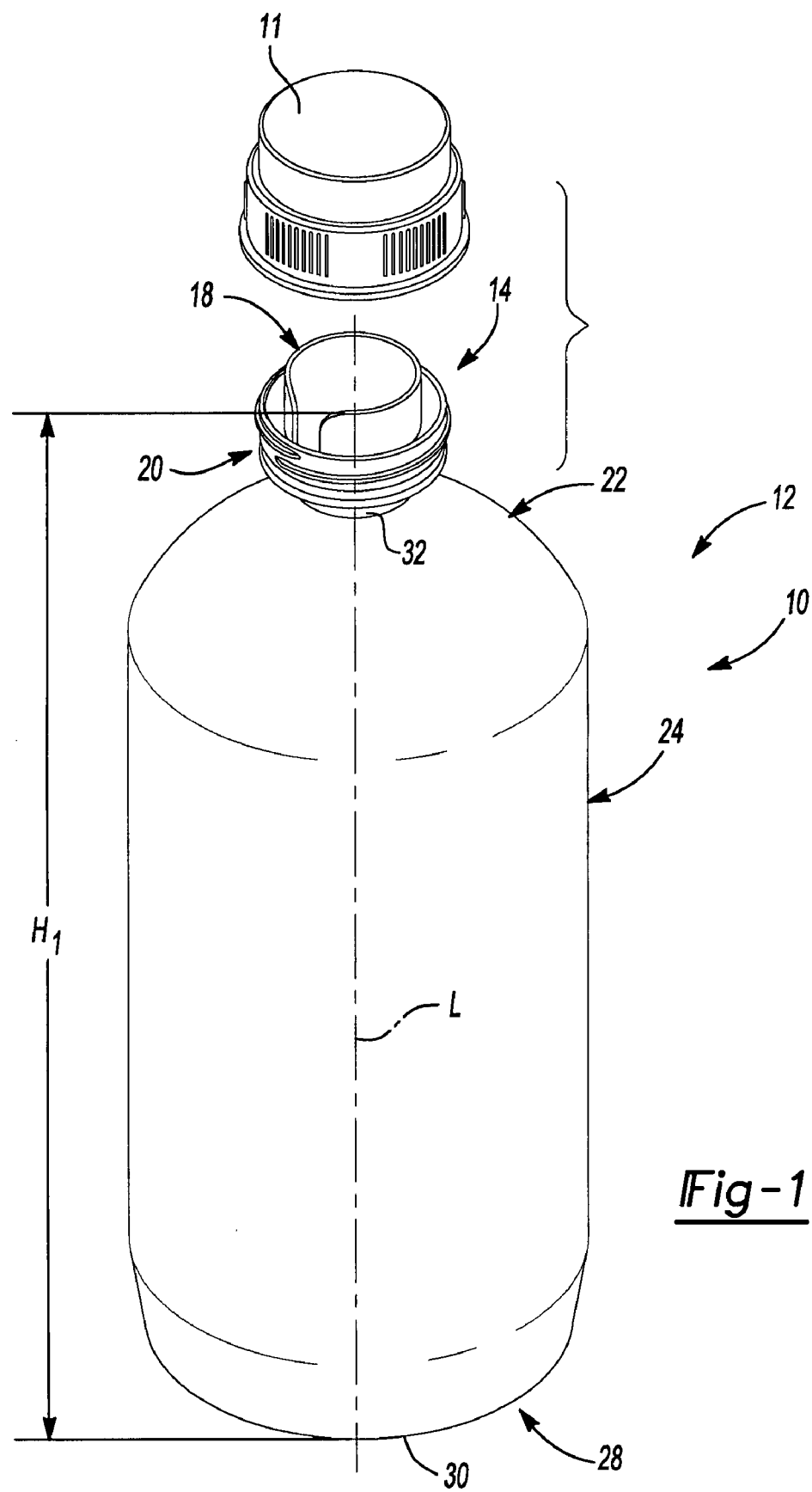
FIG. 1 is a side elevational view of a one-piece plastic container constructed in accordance with the teachings of the present disclosure and shown with an exemplary cap.
Figure 2:
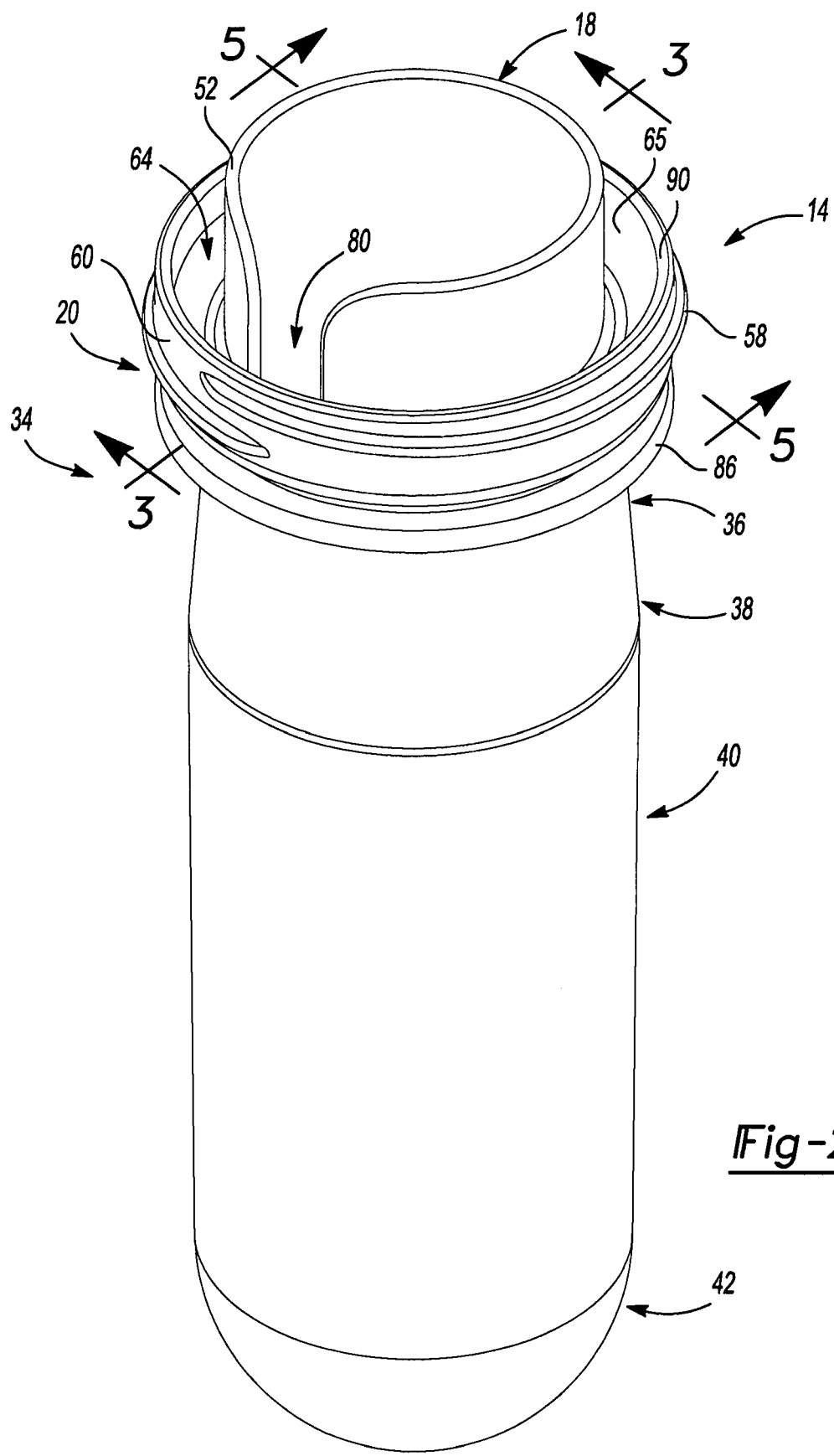
FIG. 2 is a perspective view of a preform used for construction of the one-piece plastic container of FIG. 1.
Figure 3:
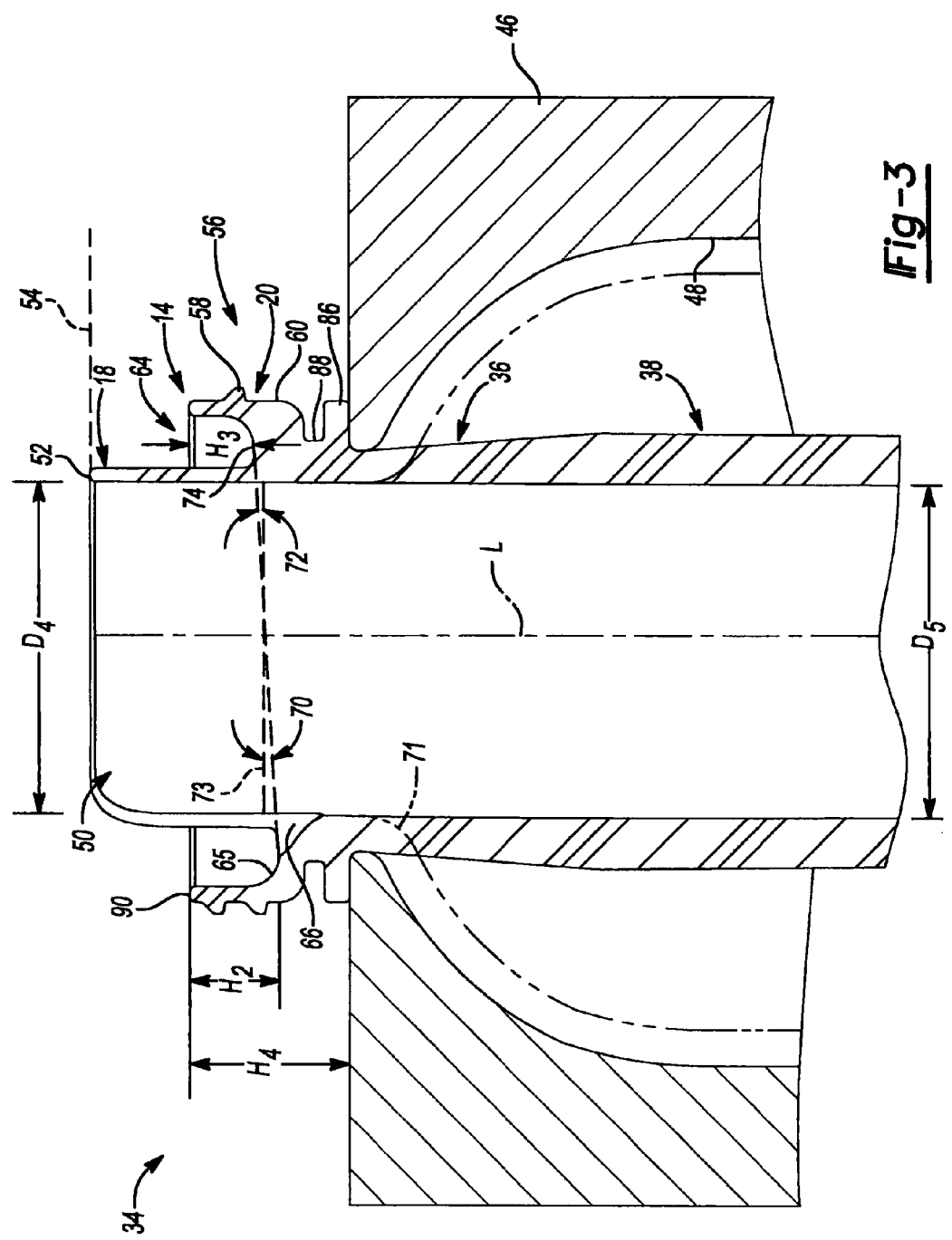
FIG. 3 is a sectional view of the preform taken along line 3-3 of FIG. 2 and shown positioned in an exemplary mold cavity used during formation of the container of FIG. 1.

FIGS. 1-3 show one preferred embodiment of the present container. In the figures, reference number 10 designates a one-piece plastic, e.g. polyethylene terephthalate (PET), container. As shown in FIG. 1, the plastic container 10 has an overall height $H_1$ of about 292.68 mm (11.52 inches). The container is shown with an exemplary cap 11. The plastic container 10 can define a longitudinal axis L and be substantially cylindrical in cross section. In this particular embodiment, the plastic container 10 has a volume capacity of about one (1) liter (1000 cc). Those of ordinary skill in the art would appreciate that the following teachings of the present disclosure are applicable to other containers, such as rectangular, triangular, hexagonal, octagonal or square shaped containers, which may have different dimensions and volume capacities. It is also contemplated that other modifications can be made depending on the specific application and environmental requirements.

As shown in FIG. 1, the one-piece plastic container 10 according to the present teachings defines a body 12, and includes an upper portion 14 having a spout 18 and a finish 20. Integrally formed with the finish 20 and extending downward therefrom is a shoulder region 22. The shoulder region 22 merges into and provides a transition between the finish 20 and a sidewall portion 24. The sidewall portion 24 extends downward from the shoulder region 22 to a base portion 28 having a base 30.

A neck 32 may also be included having an extremely short height, that is, becoming a short extension from the finish 20, or an elongated height, extending between the finish 20 and the shoulder region 22. The plastic container 10 has been designed to retain a commodity. The commodity may be in any form such as a solid or liquid product. In one example, a liquid commodity may be introduced into the container during a thermal process, typically a hot-fill process. For hot-fill bottling applications, bottlers generally fill the plastic container 10 with a liquid or product at an elevated temperature between approximately 155° F. to 205° F. (approximately 68° C. to 96° C.) and seal the plastic container 10 with the cap or closure 11 before cooling. In addition, the plastic container 10 may be suitable for other high-temperature pasteurization or retort filling processes or other thermal processes as well. In another example, the commodity may be introduced into the plastic container 10 under ambient temperatures.

The plastic container 10 of the present disclosure is an injection-stretch blow molded, biaxially oriented container with a unitary construction from a single or multi-layer material. A well-known stretch-molding, heat-setting process for making the one-piece plastic container 10 generally involves the manufacture of a preform 34 (FIG. 2) of a polyester material, such as polyethylene terephthalate (PET), having a shape well known to those skilled in the art similar to a test-tube with a generally cylindrical cross section and a length typically approximately fifty percent (50%) that of the resultant container height. In one example, the preform 34 can be injection molded. As will be appreciated, the upper portion 14 (i.e. the spout 18 and the finish 20), remains substantially unchanged from its preform state while the container body 12 is formed below the finish 20. For reference purposes, features of the upper portion 14 have been described interchangeably for the plastic container 10 and the preform 34. An exemplary method of manufacturing the plastic container 10 will be described in greater detail below.

Turning now to FIGS. 2-7, the preform 34 will be further described. The preform 34 generally includes the upper portion 14, a neck-forming region 36, a shoulder-forming region 38, a sidewall-forming region 40 and a base-forming region 42. The preform 34 is shown placed into a mold cavity 46 in FIG. 3. As mentioned above, the upper portion 14 including the spout 18 and the finish 20, of the preform 34 remains substantially unchanged during blowing, filling and shipping operations. The container 10 is also shown in phantom in FIG. 3 after the preform 34 has undergone a blow-molding process. Specifically, the neck-forming region 36, the shoulder-forming region 38, the sidewall-forming region 40 and the base-forming region 42 are all expanded in the mold cavity 46 to create the neck 32 (FIG. 1), the shoulder region 22, the sidewall portion 24, and the base portion 28 of the resultant plastic container 10, respectively. As shown in phantom in FIG. 3, the container 10 can include a substantially smooth and continuous second transition 71 between the inner surface of the sidewall and the inner surface of the spout 18. While not shown in its entirety, it is appreciated that the mold 46 defines a mold surface 48 conforming to the shape of the resultant plastic container 10.

The upper portion 14 will now be further described. The spout 18 includes a terminal lip 52 that defines an opening 50 into the preform 34 (and likewise into the resultant plastic container 10). The terminal lip 52 can define a plane 54 (FIG. 3) that extends substantially perpendicularly to the longitudinal axis L. In other examples, the spout 18 may define an angle relative to the base 30. The spout 18 assists in channeling, funneling and/or metering the commodity as it is poured from the plastic container 10 through the opening 50. The finish 20 of the plastic container 10 includes a threaded region 56 having at least one thread 58 formed on an annular sidewall 60. The threaded region 56 provides a means for attachment of a similarly threaded closure or cap (i.e. cap 11, FIG. 1). The exemplary cap 11 defines at least one thread (not shown) formed around an inner diameter for cooperatively riding along the thread 58 of the finish 20. Alternatives may include other suitable devices that engage the finish 20 of the plastic container 10. Accordingly, the closure or cap 11 engages the finish 20 to preferably provide a hermetical seal of the plastic container 10. The closure or cap 11 is preferably of a plastic or metal material conventional to the closure industry and suitable for subsequent thermal processing, including high temperature pasteurization and retort.

A trough 64 is formed radially at a transition between the finish 20 and the spout 18. The trough 64 defines a generally arcuate surface 65 having a passage 66 into the body 12 of the plastic container 10. In this way, contents remaining on the cap 11 after pouring may drip through the passage 66 and back into the plastic container 10, subsequent to cap reapplication. The trough 64 generally defines an angle sloped toward the passage 66. As a result, such contents can be further directed toward the passage 66 (by gravity) once in the trough 64. In one example, as shown in FIG. 3, the trough 64 can define a first angle 70 from the passage 66 to the longitudinal axis L relative to a transverse line 73 drawn through the plastic container 10. The trough 64 can define a second angle 72 from the longitudinal axis L to a diametrically opposed point 74 on the trough 64 relative to the transverse line 73. The first angle 70 can be greater than the second angle 72. In one example, the first angle 70 can be 5 degrees and the second angle 72 can be 2 degrees. In other examples, the first angle 70 can be less than or equivalent to the second angle 72. It is appreciated that other angles can be used.

A longitudinal slot 80 (FIG. 4) is formed on the spout 18 between the terminal lip 52 to the passage 66. The terminal lip 52 transitions to the longitudinal slot 80 along arcuate surfaces 82. The finish 20 may include a support ring 86. A radial channel 88 may be formed between the support ring 86 and the annular sidewall 60. The support ring 86 may be used to carry or orient the preform 34 through and at various stages of manufacture. For example, the preform 34 may be carried by the support ring 86, the support ring 86 may be used to aid in positioning the preform 34 in the mold cavity 46, or an end consumer may use the support ring 86 to carry the plastic container 10 once manufactured.

During use, the plastic container 10 may be tipped generally in a direction away from the longitudinal slot 80 thereby directing the commodity toward the terminal lip 52 when pouring. In this way, the terminal lip 52 of the spout 18 may direct the commodity in a controlled, metered manner when poured from the plastic container 10. In one example, a handle (not shown) may be provided on the sidewall portion 24 (FIG. 1) opposite the passage 66 to facilitate tipping of the plastic container 10 during pouring.

Figure 4:
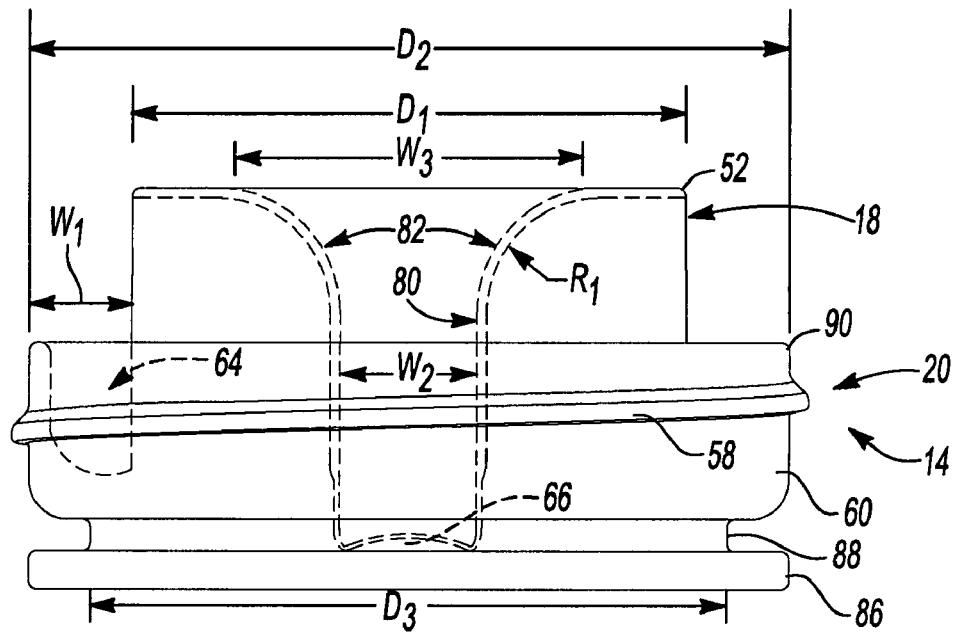
FIG. 4 is a detail side view of an upper portion of the one-piece plastic container of FIG. 1, the upper portion including a finish and a spout.

With continued reference now to FIG. 4, exemplary dimensions for the upper portion 14 will be described. It is appreciated that other dimensions may be used. A diameter $D_1$ of the spout 18 may be 32.92 mm (1.30 inch). A diameter $D_2$ of the finish 20 and the support ring 86 may be 49.68 mm (1.96 inch). A diameter $D_3$ of the radial channel 88 may be 41.68 mm (1.64 inch). A width $W_1$ of the trough 64 may be 5.97 mm (0.23 inch). A width $W_2$ of the longitudinal slot 80 may be 9 mm (0.35 inch). A width $W_3$ taken at the transition from the terminal lip 52 to the arcuate surfaces 82 may be 25 mm (0.98 inch). A radius $R_1$ of the arcuate surfaces 82 may be 8 mm (0.32 inch).

As best shown in FIG. 3, a height $H_2$ from a top 90 of the finish 20 to the trough 64 at the passage 66 may be 8.8 mm (0.35 inch). A height $H_3$ from the top 90 of the finish 20 to the trough 64 at the diametrically opposed point 74 may be 6.44 mm (0.25 inch). A height $H_4$ from the top 90 of the finish 20 to the bottom of the support ring 86 may be 15.9 mm (0.67 inch). An inner diameter $D_4$ of the opening 50 may be 32.92 mm (1.30 inch). An inner diameter $D_5$ of the preform 34 may be 32.60 mm (1.28 inch). In general, $D_4$ is greater than or equal to $D_5$, i.e. $D_4 \geq D_5$.

Figure 5:
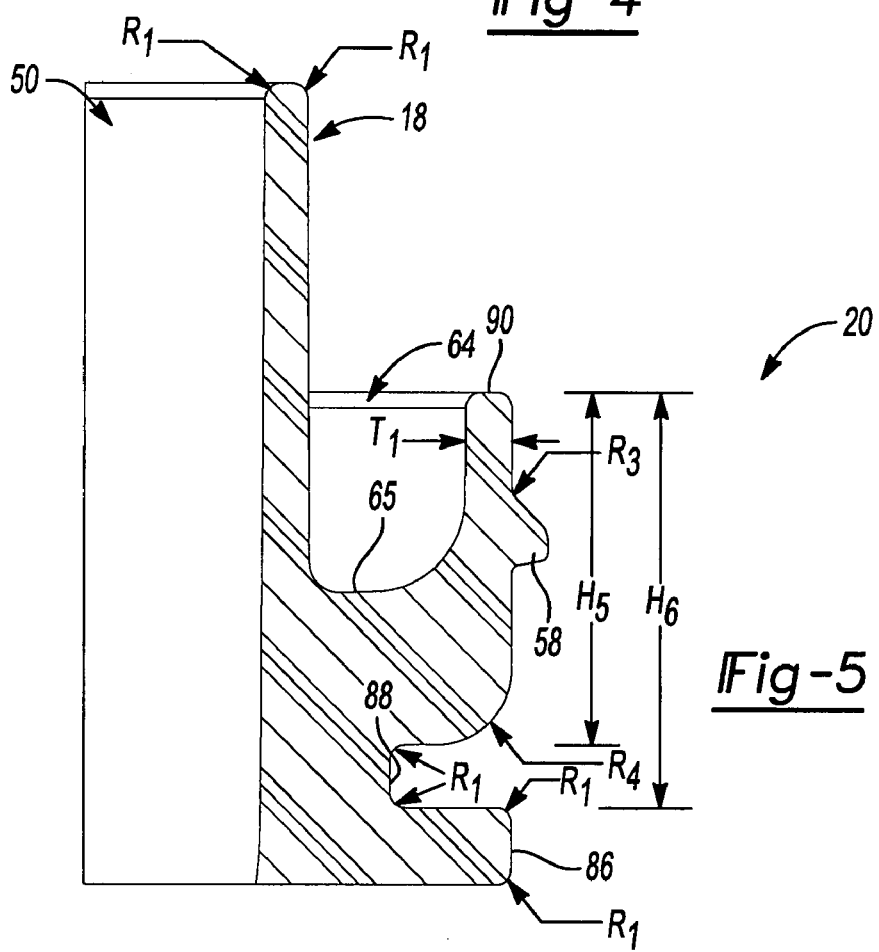
FIG. 5 is a sectional view of the upper portion taken along line 5-5 of FIG. 2.

With reference now to FIG. 5, additional exemplary dimensions for the finish 20 will be described. A height $H_5$ from the top 90 of the finish 20 to the top of the radial channel 88 may be 11.38 mm (0.45 inch). A height $H_6$ from the top 90 of the finish 20 to the top of the support ring 86 may be 13.41 mm (0.53 inch). A wall thickness $T_1$ of the finish 20 taken above the thread(s) 58 may be 1.53 mm (0.06 inch). Various radii will now be listed with exemplary dimensions. $R_1$ may be 0.51 mm (0.02 inch). $R_2$ may be 0.75 mm (0.03 inch). $R_3$ may be 0.25 mm (0.01 inch). $R_4$ may be 2.5 mm (0.10 inch).

Figure 6:
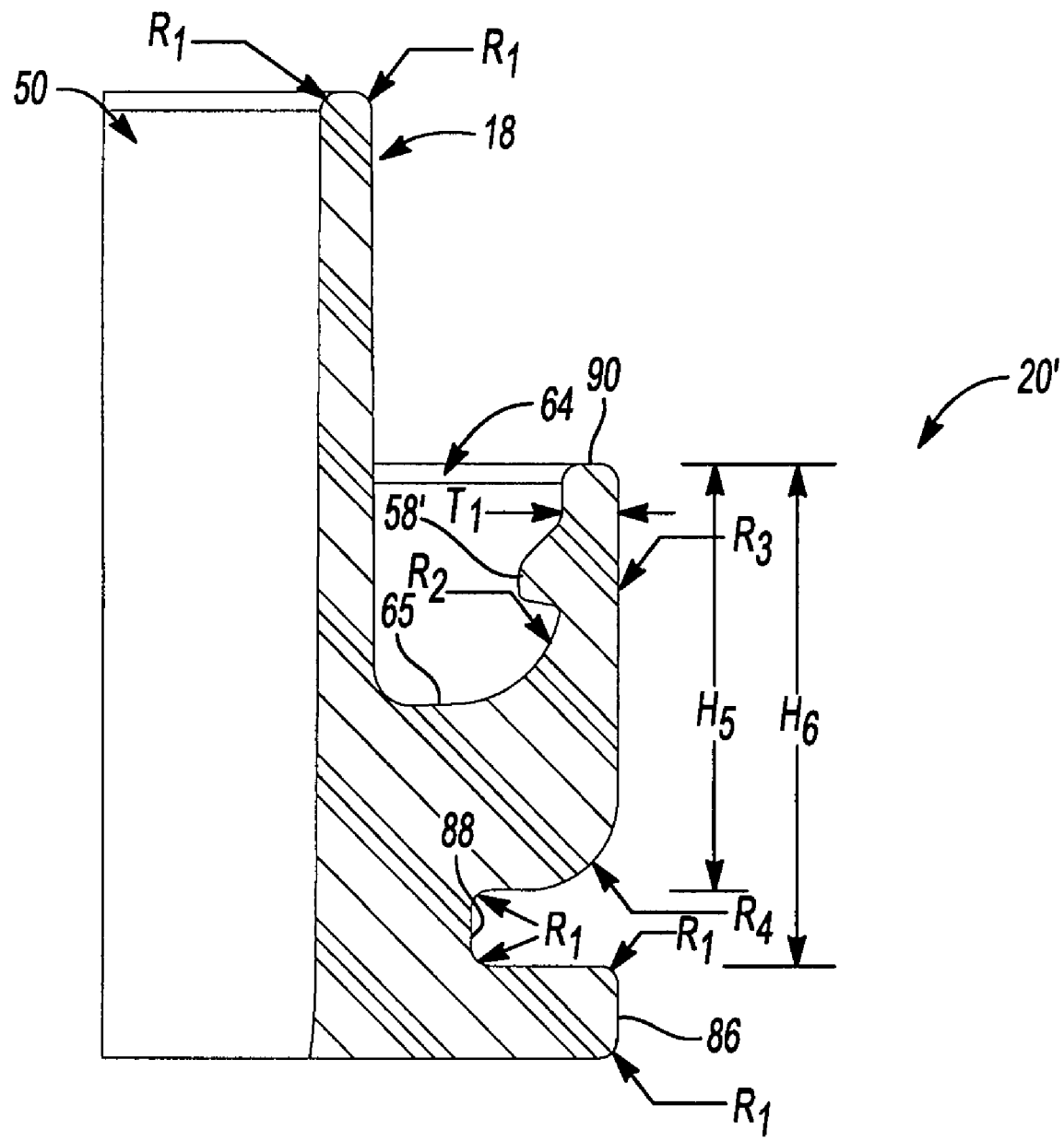
FIG. 6 is a sectional view of an upper portion according to additional features.
Figure 7:
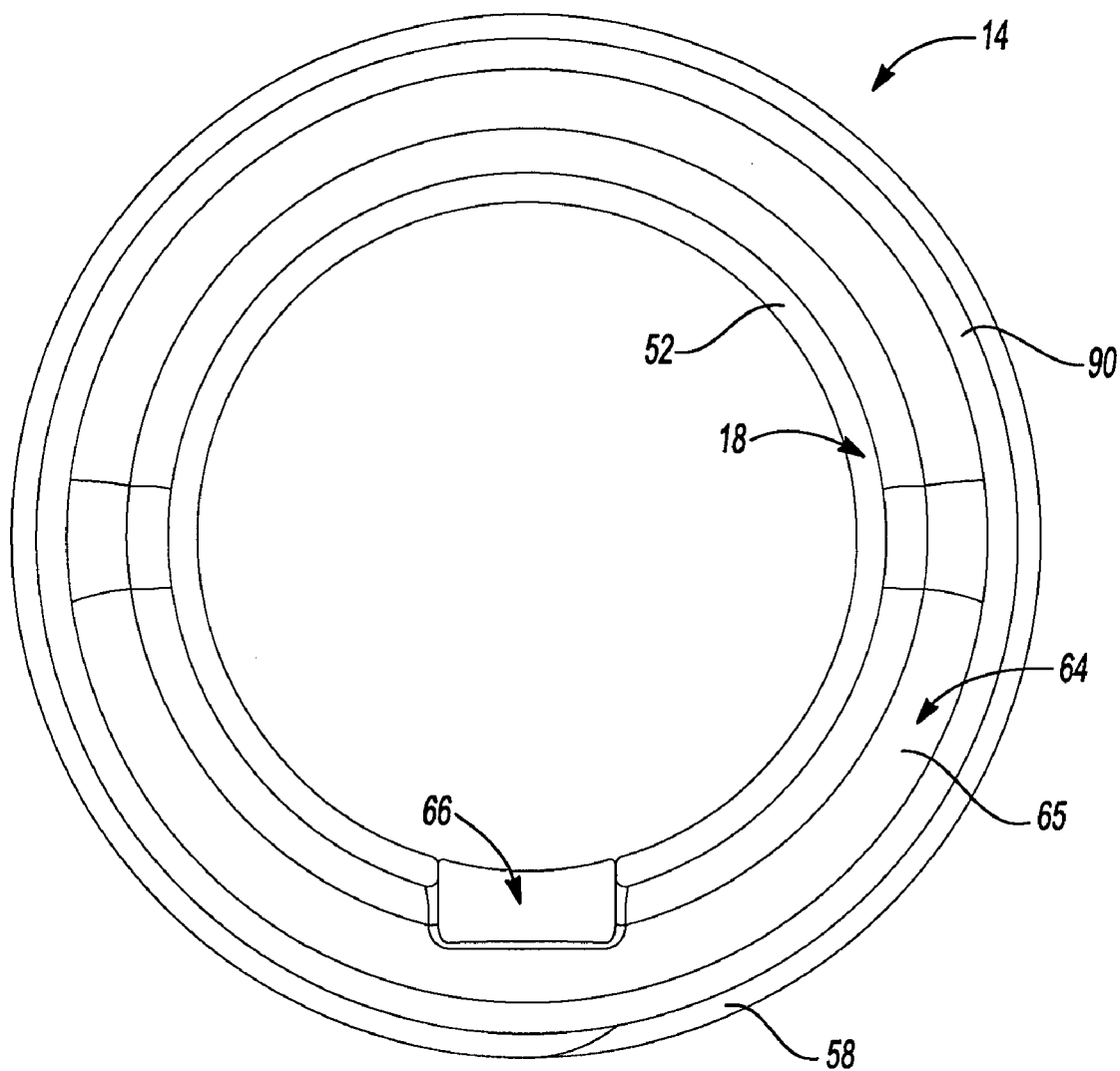
FIG. 7 is a top view of the preform of FIG. 2.

As shown in FIG. 6, a finish 20' is shown according to additional features. The finish 20' includes at least one thread 58' formed on an inner diameter thereof. As can be appreciated, a cap (not shown) can have at least one complementary thread formed on an outer diameter for engaging the thread(s) 58'.

In one example, a machine (not illustrated) places the preform 34 heated to a temperature between approximately 190° F. to 250° F. (approximately 88° C. to 121° C.) into the mold cavity 46. The mold cavity 46 may be heated to a temperature between approximately 250° F. to 350° F. (approximately 121° C. to 177° C.). A stretch rod apparatus (not illustrated) stretches or extends the heated preform 34 within the mold cavity 46 to a length approximately that of the resultant plastic container 10 thereby molecularly orienting the polyester material in an axial direction generally corresponding with the central longitudinal axis L of the plastic container 10. Again, during the stretching process, the finish 20 remains unchanged in an injection molded state while the container body 12 is formed below the finish 20. While the stretch rod extends the preform 34, air having a pressure between 300 PSI to 600 PSI (2.07 MPa to 4.14 MPa) assists in extending the preform 34 in the axial direction and in expanding the preform 34 in a circumferential or hoop direction thereby substantially conforming the polyester material to the shape of the mold cavity 46 (e.g., the mold surface 48) and further molecularly orienting the polyester material in a direction generally perpendicular to the axial direction, thus establishing the biaxial molecular orientation of the polyester material in most of the plastic container 10. The pressurized air holds the mostly biaxial molecularly oriented polyester material against the mold surface 48 of the mold cavity 46 for a period of approximately two (2) to five (5) seconds before removal of the plastic container 10 from the mold cavity 46. This process is known as heat setting and results in a heat-resistant container suitable for filling with a product at high temperatures.

In another example, a machine (not illustrated) places the preform 34 heated to a temperature between approximately 185° F. to 239° F. (approximately 85° C. to 115° C.) into the mold cavity 46. The mold cavity 46 may be chilled to a temperature between approximately 32° F. to 75° F. (approximately 0° C. to 24° C.). A stretch rod apparatus (not illustrated) stretches or extends the heated preform 34 within the mold cavity 46 to a length approximately that of the resultant plastic container 10 thereby molecularly orienting the polyester material in an axial direction generally corresponding with the central longitudinal axis L of the plastic container 10. Again, during the stretching process, the finish 20 remains unchanged in an injection molded state while the container body 12 is formed below the finish 20. While the stretch rod extends the preform 34, air having a pressure between 300 PSI to 600 PSI (2.07 MPa to 4.14 MPa) assists in extending the preform 34 in the axial direction and in expanding the preform 34 in a circumferential or hoop direction thereby substantially conforming the polyester material to the shape of the mold cavity 46 (e.g., the mold surface 48) and further molecularly orienting the polyester material in a direction generally perpendicular to the axial direction, thus establishing the biaxial molecular orientation of the polyester material in most of the plastic container 10. The pressurized air holds the mostly biaxial molecularly oriented polyester material against the mold cavity 46 for a period of approximately two (2) to five (5) seconds before removal of the plastic container 10 from the mold cavity 46. This process is utilized to produce containers suitable for filling with product under ambient conditions or cold temperatures.

Alternatively, other manufacturing methods using other conventional materials including, for example, high density polyethylene, polypropylene, polyethylene naphthalate (PEN), a PET/PEN blend or copolymer, and various multi-layer structures may be suitable for the manufacture of the plastic container 10. Those having ordinary skill in the art will readily know and understand plastic container manufacturing method alternatives.

Figure 8:
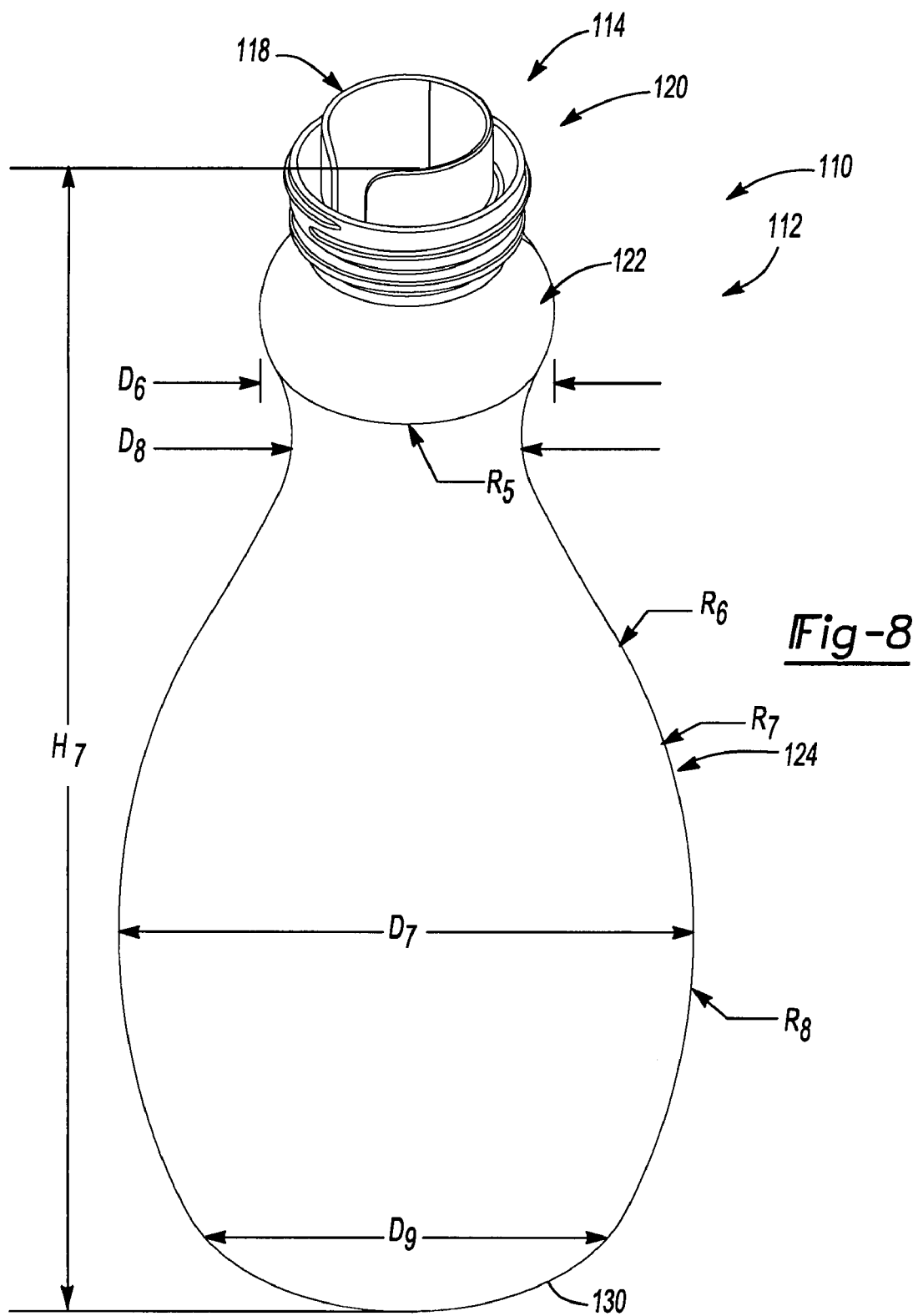
FIG. 8 is a side view of an upper portion of a container constructed in accordance with additional features of the present disclosure.

With reference now to FIG. 8, another one-piece plastic, e.g. PET container 110 according to additional features is shown. The plastic container 110 generally defines a body 112, and includes an upper portion 114 having a spout 118 and a finish 120, similar to the spout 18 and the finish 20 as described above. The plastic container 110 can be formed by the injection-stretch blow molding process described above. Accordingly, the spout 118 and the finish 120 remain substantially unchanged from their preform state while the container body 112 is formed below the finish 120. The plastic container 110 has an overall height $H_7$ of about 270.74 mm (10.66 inches). The plastic container 110 generally includes a first and a second bulbous portion 122 and 124, respectively. A diameter $D_6$ of the plastic container 110 taken at the first bulbous portion 122 may be 61.93 mm (2.44 inches). A diameter $D_7$ of the plastic container 110 taken at the second bulbous portion 124 may be 121.62 mm (4.79 inches). A diameter $D_8$ of the plastic container 110 taken at a transition between the first and second bulbous portions 122 and 124 may be 48.5 mm (1.91 inch). A diameter $D_9$ of the plastic container 110 taken at a base 130 may be 85.32 mm (3.36 inches). A radius $R_5$ may be 56.03 mm (2.21 inches). A radius $R_6$ may be 732.54 mm (28.84 inches). A radius $R_7$ may be 152.67 mm (6.01 inches). A radius $R_8$ may be 161.58 mm (6.36 inches).

While the above description constitutes the present disclosure, it will be appreciated that the disclosure is susceptible to modification, variation and change without departing from the proper scope and fair meaning of the accompanying claims.

What is claimed is:

1. A one-piece plastic container comprising:
a body defining a longitudinal axis and having an upper portion, a sidewall portion and a base portion, said upper portion being injection molded and said sidewall portion and said base portion being stretch blow molded, said sidewall portion including a sidewall inner surface, said upper portion having a spout with a spout inner diameter surface defining an opening into the container and a finish offset radially outwardly from said spout, wherein a trough is formed at a first transition between said finish and said spout, said trough defining a passage into said body, said finish defining an annular sidewall having an inner diameter and an outer diameter, said outer diameter defining at least one thread and said inner diameter defining a threadless surface that transitions into an arcuate surface that forms part of said trough, said at least one thread and said threadless surface being on opposite sides of said annular sidewall, a second transition between said sidewall inner surface and said spout inner diameter surface being substantially smooth and continuous, said upper portion also including a support ring on an outer surface thereof, said support ring extending radially outward from said outer surface, said support ring being disposed along the longitudinal axis between said finish and said sidewall portion, said container configured to be supported by said support ring for stretch blow molding of said sidewall portion and said base portion, wherein the at least one thread extends radially outward from the outer diameter of the sidewall, and wherein the support ring has an equal diameter to the outer diameter of the sidewall.

2. The one-piece plastic container of claim 1 wherein said trough slopes toward said passage and defines a non-orthogonal angle relative to said longitudinal axis.

3. The one-piece plastic container of claim 2 wherein said sidewall portion is integrally formed with and extends from said upper portion to said base portion, said base portion closing off an end of the container.

4. The one-piece plastic container of claim 3 wherein said at least one thread of said finish is for attaching a closure thereon.

5. The one-piece plastic container of claim 3 wherein said spout includes a terminal lip defining a plane that extends generally perpendicularly to said longitudinal axis.

6. The one-piece plastic container of claim 5 wherein said terminal lip is offset entirely above said finish in a direction away from said base.

7. The one-piece plastic container of claim 6 wherein said spout defines a longitudinal slot extending from said terminal lip to said passage.

8. The one-piece plastic container of claim 7 wherein said terminal lip transitions to said longitudinal slot along arcuate surfaces.

9. The one-piece plastic container of claim 2 wherein said trough defines a first angle relative to a transverse line drawn through the container from said longitudinal axis to said passage and a second angle relative to the transverse line from said longitudinal axis to a diametrically opposed point relative to the passage, wherein said first angle is greater than said second angle.

10. The one-piece plastic container of claim 9 wherein said first angle is substantially about 5 degrees and said second angle is substantially about 2 degrees.

11. The one-piece plastic container of claim 1 wherein the container is composed of polyethylene terephthalate.

12. The one-piece plastic container of claim 11 wherein said sidewall portion and said base portion are both biaxially oriented.

13. A one-piece plastic container comprising:
an injection molded upper portion comprising:
a spout defining an opening into the container, said spout including a spout inner diameter surface; and
a finish offset radially outwardly from said spout;
a support ring on an outer surface of the upper portion, said support ring extending radially outward from said outer surface;
wherein a trough is formed at a first transition between said finish and said spout, said trough defining a passage into said body, said finish defining an annular sidewall having an inner diameter and an outer diameter, said outer diameter defining at least one thread and said inner diameter defining a threadless surface that transitions into an arcuate surface that forms part of said trough, said at least one thread and said threadless surface being on opposite sides of said annular sidewall;
a shoulder region integrally formed with and extending from said upper portion; and
a stretch blow molded sidewall portion defining a longitudinal axis and extending from said shoulder region to a base portion, said sidewall portion including a sidewall inner surface, said base portion closing off an end of the container and defining a first plane, a second transition between said sidewall inner surface and said spout inner diameter surface being substantially smooth and continuous, said support ring being disposed along the longitudinal axis between said finish and said sidewall portion;

wherein said opening defines a second plane that is generally parallel to said first plane, wherein said container is configured to be supported by said support ring for stretch blow molding of said sidewall portion and said base portion, and wherein the at least one thread extends radially outward from the outer diameter of the sidewall, and wherein the support ring has an equal diameter to the outer diameter of the sidewall.

14. The one-piece plastic container of claim 13 wherein said trough slopes toward said passage and defines a non-orthogonal angle relative to said longitudinal axis.

15. The one-piece plastic container of claim 13 wherein said at least one thread of said finish is for attaching a closure thereon.

16. The one-piece plastic container of claim 14 wherein said spout includes a terminal lip defining a plane that extends generally perpendicularly to said longitudinal axis.

17. The one-piece plastic container of claim 16 wherein said terminal lip is offset entirely above said finish in a direction away from said base.

18. The one-piece plastic container of claim 17 wherein said spout defines a longitudinal slot extending from said terminal lip to said passage.

19. The one-piece plastic container of claim 18 wherein said terminal lip transitions to said longitudinal slot along arcuate surfaces.

20. A preform adapted to be stretch blow molded into a one-piece plastic container, the preform comprising:

a body defining a longitudinal axis and having an upper portion, a sidewall portion and a base portion, said sidewall portion and said base portion configured to be stretch blow molded into the one-piece plastic container without substantially changing said upper portion, said sidewall portion including a sidewall inner surface, said upper portion having a spout defining an opening into said preform and a finish offset radially outwardly from said spout, said spout including a spout inner diameter surface, wherein a trough is formed at a first transition between said finish and said spout, said trough defining a passage into said body, said finish defining an annular sidewall having an inner diameter and an outer diameter, said outer diameter defining at least one thread and said inner diameter defining a threadless surface that transitions into an arcuate surface that forms part of said trough, said at least one thread and said threadless surface being on opposite sides of said annular sidewall, a second transition between said sidewall inner surface and said spout inner diameter surface being substantially smooth and continuous, said upper portion also including a support ring on an outer surface thereof, said support ring extending radially outward from said outer surface, said support ring being disposed along the longitudinal axis between said finish and said sidewall portion, said preform configured to be carried by the support ring for stretch blow molding of said sidewall portion and said base portion, wherein the at least one thread extends radially outward from the outer diameter of the sidewall, and wherein the support ring has an equal diameter to the outer diameter of the sidewall.

21. The preform of claim 20 wherein said trough slopes toward said passage and defines a non-orthogonal angle relative to said longitudinal axis.

22. The preform of claim 20 wherein said spout includes a terminal lip defining a plane that extends generally perpendicularly to said longitudinal axis.

23. The preform of claim 22 wherein said terminal lip is offset entirely above said finish in a direction away from said base.

24. The preform of claim 23 wherein said spout defines a longitudinal slot extending from said terminal lip to said passage.

25. The preform of claim 24 wherein said terminal lip transitions to said longitudinal slot along arcuate surfaces.

26. The preform of claim 20 wherein said trough defines a first angle relative to a transverse line drawn through the preform from said longitudinal axis to said passage and a second angle relative to the transverse line from said longitudinal axis to a diametrically opposed point relative to the passage, wherein said first angle is greater than said second angle.

* * * * *